P. DENISON.
COUPLING.
APPLICATION FILED OCT. 8, 1919.

1,426,628.

Patented Aug. 22, 1922.

INVENTOR.
Peter Denison
BY Morrell & Keeney
ATTORNEYS

UNITED STATES PATENT OFFICE.

PETER DENISON, OF RACINE, WISCONSIN.

COUPLING.

1,426,628.        Specification of Letters Patent.   Patented Aug. 22, 1922.

Application filed October 8, 1919. Serial No. 329,290.

*To all whom it may concern:*

Be it known that I, PETER DENISON, a citizen of the United States, and resident of Racine, in the county of Racine and State of Wisconsin, have invented new and useful Improvements in Couplings, of which the following is a description, reference being had to the accompanying drawings, which are a part of this specification.

The present invention relates to certain new and useful improvements in couplings, especially designed for use in connection with the steering gear of an automobile or the like.

It is the present practice to weld the tubular steering column and the shaft connecting the same with the steering gear together which causes considerable waste of material in the case of a breakage, in that an entirely new steering column and steering mechanism shaft must be provided. Hence, with this and other inherent objections in mind, my invention has for one of its objects to provide a coupling between the steering wheel column and the steering mechanism shaft which will afford greater facility for dissembling and replacing new parts of the steering gear of an automobile or the like.

Another object of the present invention is to provide a coupling of the class described which will give increased strength where a strain is produced between two connected shafts, whereby breakage at the coupling is practically eliminated.

A further object of the present invention is to provide a coupling in which a tubular shaft has one end internally threaded to receive the threaded end of another shaft, and having means detachably carried by the tubular shaft for locking the threaded end of the other shaft therein against accidental dislodgment.

With the above and other objects in view which will appear as the discription proceeds, my invention resides in a novel construction, combination, and arrangement of parts substantially as hereinafter described and more particularly defined by the appended claims, it being understood that such changes in the precise embodiment of the herein disclosed invention may be made as come within the scope of the claims.

In the accompanying drawing I have illustrated one complete example of the physical embodiment of my invention constructed according to the best mode I have so far devised for the practical application of the principles thereof, and in which.

Figure 1:
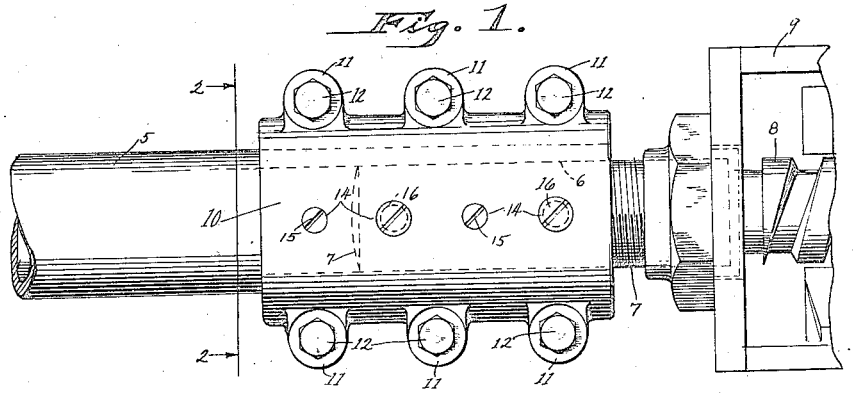
Fig. 1 is a plan view of my improved coupling connecting the steering column of an automobile with the shaft of the steering mechanism, the column and steering mechanism being broken away.
Figure 2:
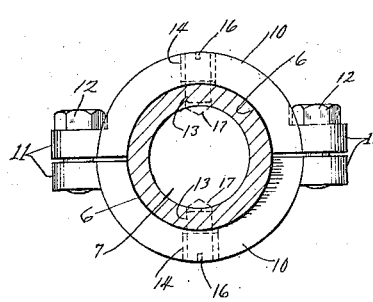
Fig. 2 is an end view of my improved coupling, said view being taken through the steering column on the line 2—2 of Figure 1.

My improved coupling is adapted for use in various ways but has particular advantages when used for coupling two shafts of an automobile steering gear or the like. In the drawing I have illustrated a tubular shaft 5 having one end connected with the steering wheel (not shown) of an automobile and its other end 6 internally threaded to receive the threaded end 7 of a worm screw 8 forming a part of the automobile steering mechanism 9, partially shown in Figure 1. It is the present practice to braze or weld the end 7 of the worm screw shaft in the end 6 of the tubing 5, but I provide the novel form of coupling now about to be described whereby the end 7 is readily removably secured to or connected with the tubing 5.

Figure 3:
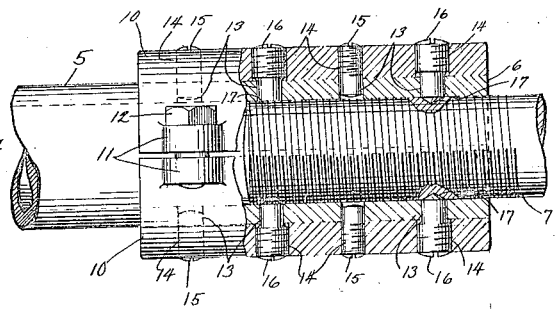
Fig. 3 is a view similar to Figure 1 with the coupling turned 90° from the position depicted in said figure, parts being broken away and in section for the purpose of illustration.

My novel form of coupling comprises two complementary sections 10 having laterally projecting ears or lugs 11 for receiving suitable binding or clamping bolts 12 for securing the sleeve-lock member thus formed upon the end 6 of the tubing 5. The end 6 of the tubing 5 is provided with a plurality of openings or apertures 13 adapted to aline with a plurality of threaded apertures 14 in the complementary sections 10. Certain of the apertures 14 have disposed therein threaded studs or screws 15 which project into the adjacent apertures 13 of the tubing 5, see Figure 3, and the other of the apertures 14 have disposed therein threaded screws or studs 16 which project through the adjacent apertures 13 of the tubing 5 and bind or impinge against the adjacent portion of the worm screw shaft end 7 as at 17.

From this structure it will be readily seen that the sleeve member formed by the sections 10 is positively secured to the end 6 together with the tubing 5 against rotation and the end 7 of the worm screw shaft is firmly held or secured in the end of the tubing 5 against movement by means of the threaded studs 16, thus effecting a positive and at the same time readily disengageable drive connection between the two shafts. While in Figure 1 I have illustrated my coupling as employed in connection with a steering gear of the worm screw type, it will be understood that same may be employed in connection with any type of steering gear or, in fact, may be used in connecting any two shafts having a male and female connection. It will also be understood that the end 7 of the jack screw shaft may be secured in the end 6 of the tubing 5 by means of the threaded screws or studs 16 alone, the jack screw shaft being illustrated as having a threaded engagement in which the end 6 of the tubing 5 has a preferred form for giving added strength for the union between the two shafts.

What I claim as my invention is:

1. A coupling for securing the end of one shaft in the adjacent end of a tubular shaft comprising a sleeve member mounted on the end of the tubular shaft, and locking members carried by the sleeve member and extending radially through the tubular shaft and impinging against the side of the other shaft.

2. A coupling for securing the end of one shaft in the adjacent end of a tubular shaft comprising a sleeve member clampingly mounted on the end of the tubular shaft, and a plurality of binding screws carried by said member and extending radially through said tubular shaft and binding against the other shaft to drivingly connect the shafts.

3. The combination with a tubular shaft and a second shaft having one end in threaded engagement with the tubular shaft, of a coupling for drivingly locking the shafts in engagement and comprising a sleeve member mounted on the tubular shaft, and binding screws extending radially through said sleeve member and tubular shaft and impinging against the other shaft to prevent the unscrewing of the same from the tubular shaft.

4. A coupling of the class described comprising two complementary sections forming a sleeve member, means for clamping the two complementary sections about a tubular shaft having a second shaft disposed therein, a series of screw members carried by said sections and engaged in openings in said tubular shaft, and a series of set screws carried by said sections and passing through openings in the tubular shaft and impinging against the second shaft.

In testimony whereof, I affix my signature

PETER DENISON.